United States Patent
Hobson (10) Patent No.: US 6,237,999 B1
(45) Date of Patent: May 29, 2001

(54) CHILD CAR SEAT

(76) Inventor: Donald A. Hobson, 4600 Don Quixote Dr., Los Angeles, CA (US) 90008

( * ) Notice: Subject to any disclaimer, the term of this patent is extended or adjusted under 35 U.S.C. 154(b) by 0 days.

(21) Appl. No.: 09/382,047

(22) Filed: Aug. 24, 1999

(51) Int. Cl.$^7$ ............................... A47D 1/10; B60N 2/28
(52) U.S. Cl. ............................... 297/256.15; 297/256.16; 297/250.1; 297/184.13
(58) Field of Search .................... 297/256.15, 256.16, 297/250.1, 184.1, 184.13; 280/30; 296/63, 65.03

(56) References Cited

U.S. PATENT DOCUMENTS

| | | | |
|---|---|---|---|
| 3,335,434 | * | 8/1967 | Gamon .......................... 297/256.15 X |
| 3,992,056 | * | 11/1976 | Koziatek et al. .............. 297/250.1 X |
| 4,500,135 | * | 2/1985 | Kincheloe .................... 297/256.15 X |
| 4,583,253 | * | 4/1986 | Hall .............................. 297/250.1 X |
| 4,650,246 | * | 3/1987 | Henriksson .................... 297/256.15 |
| 4,711,490 | * | 12/1987 | Brand ........................... 297/256.15 X |
| 4,729,600 | * | 3/1988 | Single, II et al. .......... 297/256.15 X |
| 4,743,063 | * | 5/1988 | Foster, Jr. .................... 297/256.15 X |
| 4,770,468 | * | 9/1988 | Shubin ......................... 297/256.15 X |
| 4,834,420 | * | 5/1989 | Sankrithi et al. ............. 297/250.1 X |
| 4,883,315 | * | 11/1989 | Ferguson ..................... 297/184.13 X |
| 5,083,837 | * | 1/1992 | Roach ......................... 297/184.13 X |
| 5,094,506 | * | 3/1992 | Costa .......................... 297/184.13 X |
| 5,098,161 | * | 3/1992 | Minami et al. ............... 297/250.1 X |
| 5,118,163 | * | 6/1992 | Brittain et al. .................. 297/250.1 |
| 5,147,109 | * | 9/1992 | Jolly ............................. 297/250.1 X |
| 5,318,339 | * | 6/1994 | Cherniak ...................... 297/250.1 X |
| 5,458,398 | * | 10/1995 | Meeker et al. .................. 297/250.1 |
| 5,466,044 | * | 11/1995 | Barley et al. ................ 297/250.1 X |
| 5,487,588 | * | 1/1996 | Burleigh et al. ............. 297/250.1 X |
| 5,551,373 | * | 9/1996 | O'Donnell .................. 297/256.15 X |
| 5,662,379 | * | 9/1997 | Zimelman ..................... 297/256.15 |
| 5,695,243 | * | 12/1997 | Anthony et al. ................ 297/250.1 |
| 5,716,095 | * | 2/1998 | Lopez ......................... 297/256.16 X |
| 5,806,924 | * | 9/1998 | Gonas ......................... 297/250.1 X |
| 5,839,789 | * | 11/1998 | Koledin ...................... 297/250.1 X |
| 6,017,087 | * | 1/2000 | Anthony et al. ............ 297/256.16 X |
| 6,024,408 | * | 2/2000 | Bello et al. .................... 297/250.1 |

\* cited by examiner

Primary Examiner—Peter M. Cuomo
Assistant Examiner—Rodney B. White
(74) Attorney, Agent, or Firm—Mitchell, Silberberg & Knupp LLP (57) ABSTRACT

There is provided a child car seat assembly for installation on an automobile seat using the seat belt provided with the automobile seat. The assembly includes a child seat having a front, a back, a first side and a second side, such that when a child is seated in the child seat the child faces the front of the child seat. Also included is a first side panel adjacent to the first side of the child seat, the first side panel having means for attaching the child car seat assembly to the automobile seat using the seat belt, such that when the seat belt is tightened as much as possible, the child seat is oriented at a right angle to the automobile seat. The invention also concerns installation of a child car seat assembly on an automobile seat using a hook connected to the child car seat assembly, the length of the connection between the hook and the child car seat assembly being adjustable. The child car seat assembly is secured to the automobile seat, and the hook is hooked to an underside portion of the automobile seat. The length of the connection between the hook and the child car seat assembly is then adjusted.

18 Claims, 8 Drawing Sheets

CHILD CAR SEAT

BACKGROUND OF THE INVENTION

1. Field of the Invention

The present invention generally concerns car seats for children and particularly relates to car seats of the type that can be installed in an automobile in order to secure a child who is too small to effectively utilize the seat belts and other safety mechanisms ordinarily provided in an automobile.

2. Description of the Prior Art

A number of different child car seats presently are in use. Typically, such conventional child car seats are installed in the back seat of an automobile which can make installation difficult, particularly if the automobile is a two-door, rather than a four-door car.

In addition, most conventional child carseats are installed so as to face rearward. That is, when a child is seated in the car seat, the child faces toward the back of the car. It is often the case that a parent or other care giver is alone with the child in the car. In this situation, monitoring the child's activities and comfort can often be very difficult when the child is facing toward the back of the car. In fact, when a child is facing rearward in the back seat of the automobile, often the back of the child car seat will completely obscure any view of the child at all.

Moreover, while the child is in this position, the child's only view typically is of the back seat of the car. This lack of visual stimulation, as well as accompanying feelings of isolation and abandonment, are further disadvantages of conventional car seats.

SUMMARY OF THE INVENTION

The present invention addresses the foregoing problems by providing a child car seat assembly that can be installed at a right angle to the automobile seat. Accordingly, a child car seat according to this aspect of the invention often can be installed in the front passenger seat of the automobile, with the child facing toward the driver seat. In this orientation, installation typically is much easier because the driver often only needs to enter through a single door of the car and typically does not need to enter the back seat of the automobile at all. This can be particularly advantageous where the automobile is a two-door car. In addition, with the child facing toward the driver's seat, it is frequently much easier to monitor the child. At the same time, the child can have direct visual contact with the driver, providing visual stimulation and a better sense of security.

Thus, in one aspect the invention concerns a child car seat assembly for installation on an automobile seat using the seat belt provided with the automobile seat. The assembly includes a child seat having a front, a back, a first side and a second side, such that when a child is seated in the child seat the child faces the front of the child seat. Also included is a first side panel adjacent to the first side of the child seat, the first side panel having means for attaching the child car seat assembly to the automobile seat using the seat belt, such that when the seat belt is tightened as much as possible, the child seat is oriented at a right angle to the automobile seat.

In a further aspect, the invention concerns installation of a child car seat assembly on an automobile seat using the seat belt provided with the automobile seat, in which the child car seat assembly is oriented at a right angle to the automobile seat. Then, while the child car seat assembly is so oriented, the child car seat assembly is strapped to the automobile seat using the seat belt. Finally, the seat belt is tightened.

The present invention also addresses the foregoing problems in the prior art by providing a child car seat assembly with a hook and strap for hooking to the underside portion of the automobile seat. When such a hook and strap assembly is used in combination with other securing means, such as means which utilize the automobile seatbelt, the child car seat often can be sufficiently secured to resist much of the jarring force which occurs in the event an automobile airbag is deployed.

Thus, in a still further aspect, the invention concerns a child car seat assembly for installation on an automobile seat using the seat belt provided with the automobile seat. The assembly includes a child seat having a front, a back, a first side and a second side, such that when a child is seated in the child seat the child faces the front of the child seat. A first side panel is adjacent to the first side of the child seat, the first side panel having means for attaching the child car seat assembly to the automobile seat using the seat belt, such that when the seat belt is tightened as much as possible, the child seat is oriented at a right angle to the automobile seat. A second side panel is adjacent to the second side of the child seat, the second side panel being sized and shaped to shield a child in the child seat from deployment of an automobile air bag. An adjustable strap is attached at one end to the second side panel and attached at its other end to a rigid hook.

Use of such a side panel often can shield a child seated in the child car seat from the impact resulting from deployment of an automobile air bag. Similarly, use of such a strap and hook assembly can provide additional stability and thereby often can prevent the entire assembly from tilting or rocking too much in the event an airbag is deployed. Thus, both additional features of the invention frequently can facilitate installation of the child car seat assembly in the front seat of an automobile.

In a still further aspect, the invention concerns installation of a child car seat assembly on an automobile seat using the seat belt provided with the automobile seat and a strap connected at one end to the child car seat assembly and connected at the other end to a hook. The child car seat assembly is oriented at a right angle to the automobile seat and the following steps are performed while the child car seat assembly is so oriented: the child car seat assembly is strapped to the automobile seat using the seat belt; the hook is hooked to the underside portion of the automobile seat; the seat belt is tightened; and the strap is tightened.

In a still further aspect, the invention concerns installation of a child car seat assembly on an automobile seat using a hook connected to the child car seat assembly, the length of the connection between the hook and the child car seat assembly being adjustable. The child car seat assembly is secured to the automobile seat, and the hook is hooked to an underside portion of the automobile seat. The length of the connection between the hook and the child car seat assembly is then adjusted.

The foregoing summary is intended merely to provide a quick understanding of the general nature of the present invention. A more complete understanding of the invention can only be obtained by reference to the following detailed description of the preferred embodiment in connection with the accompanying drawings.

DESCRIPTION OF THE PREFERRED EMBODIMENT

Figure 1:
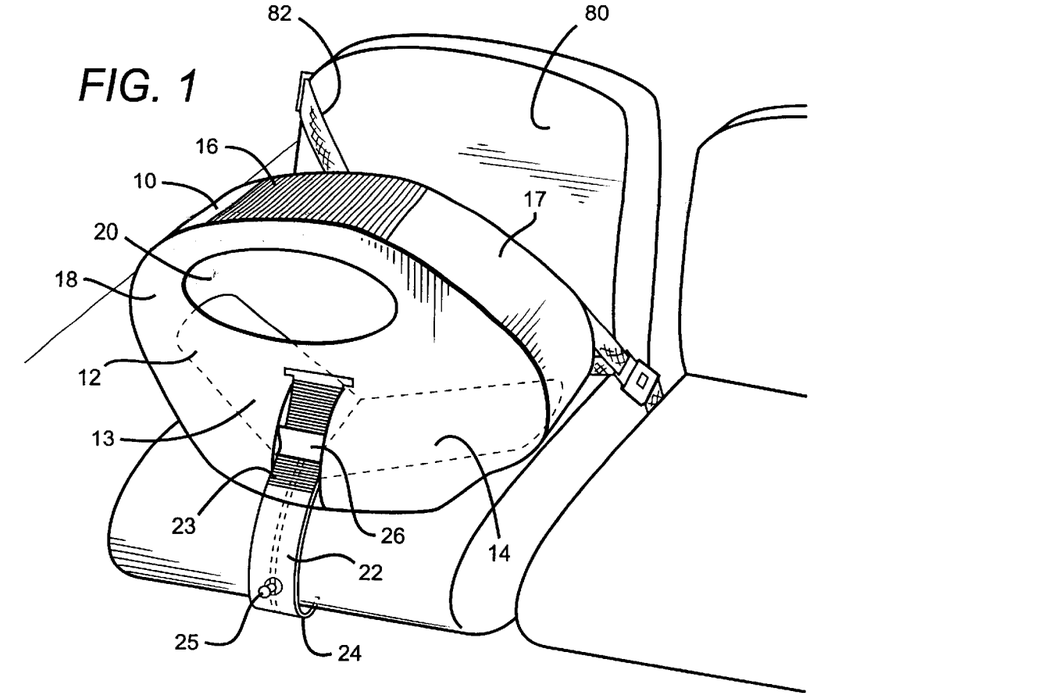
FIG. 1 is a perspective view of a child car seat assembly according to a representative embodiment of the invention.

FIG. 1 illustrates a child car seat assembly installed in an automobile according to a preferred embodiment of the invention. As shown in FIG. 1, child car seat assembly 10 includes a seat 13 which includes a back portion 12 and a seat portion 14. On the right side of child car seat assembly 10 is panel 18. Car seat assembly 10 also includes an open front portion 17, a top panel 16, a strap 22 and a hook 24 for hooking to an underside portion of automobile seat 80, thereby partially securing car seat assembly 10 to automobile seat 80.

In order to facilitate the securing of car seat assembly 10 to automobile seat 80, it is preferable that strap 22 can be tightened. In the embodiment shown in FIG. 1, tightening is accomplished by forming ridges 23 into strap 22 and having ridged portion 23 pass underneath spring-loaded latch 26. Each of ridges 23 preferably has a curved side and a flat side, such that strap 22 can be pulled upward so as to tighten strap 22. When pulled in this manner, the curved portion of each of ridges 23 lifts latch 26, and the flat side causes latch 26 to settle in the space between adjacent ridges 23. The flat side of each ridge 23 also prevents strap 22 from moving downward in relation to latch 26 unless latch 26 is manually lifted, in which case strap 22 can be moved freely in either direction. Such a tightening mechanism is well known in the art and permits strap 22 to be securely tightened so as to fasten child car seat assembly 10 to automobile seat 80.

Although the preferred embodiment of the invention uses the above-described tightening mechanism, it should be understood that any other tightening mechanism may instead be used. For example, strap 22 may instead be tightened using a conventional belt buckle mechanism in which one end of the belt has a buckle which can be inserted through any one of plural holes in the other end of the belt, thereby providing varying degrees of tightness.

Also included with hook 24 is a clamping mechanism 25 so as to permit hook 24 to be clamped to automobile seat 80, providing an even more secure connection to automobile seat 80. Preferably, clamping mechanism 25 is implemented as a threaded device which when rotated clockwise provides a vice-like clamping effect with the opposite surface of hook 24.

In operation, hook 24 is first hooked to the underside of automobile seat 80. Then, strap 22 is pulled upward so as to tighten strap 22. It is noted that clamping mechanism 25 may be engaged prior to or after tightening belt 22. In order to subsequently detach child car seat assembly 10 from automobile seat 80, latch 26 is pivoted upwardly to loosen strap 22 and clamping mechanism 25 is disengaged, not necessarily in that order. Then, hook 24 can be removed from the underside of automobile seat 80.

Car seat assembly 10 preferably is also secured to automobile seat 80 using the seatbelt 82 provided with the automobile. This is described in more detail below in connection with FIG. 2.

The entire outer structure of child car seat assembly 10 preferably is comprised of a hard plastic, but instead may be comprised of any other material which is sufficiently hard to shield against the force of impact which occurs when an automobile airbag deploys. In the event that child car seat assembly 10 is comprised of an opaque material, child car seat assembly 10 may also be provided with a clear side window 20 which allows the child to see toward the front of the automobile.

When child car seat assembly 10 is mounted as shown in FIG. 1, a child seated in child car seat assembly 10 will look toward the adjacent seat. Thus, for example, child car seat assembly 10 may be mounted in the front passenger seat of an automobile, permitting a child to directly face the driver's seat of the automobile. This can enable constant and unobstructed visual contact between the driver and the child.

Figures 2, 3:
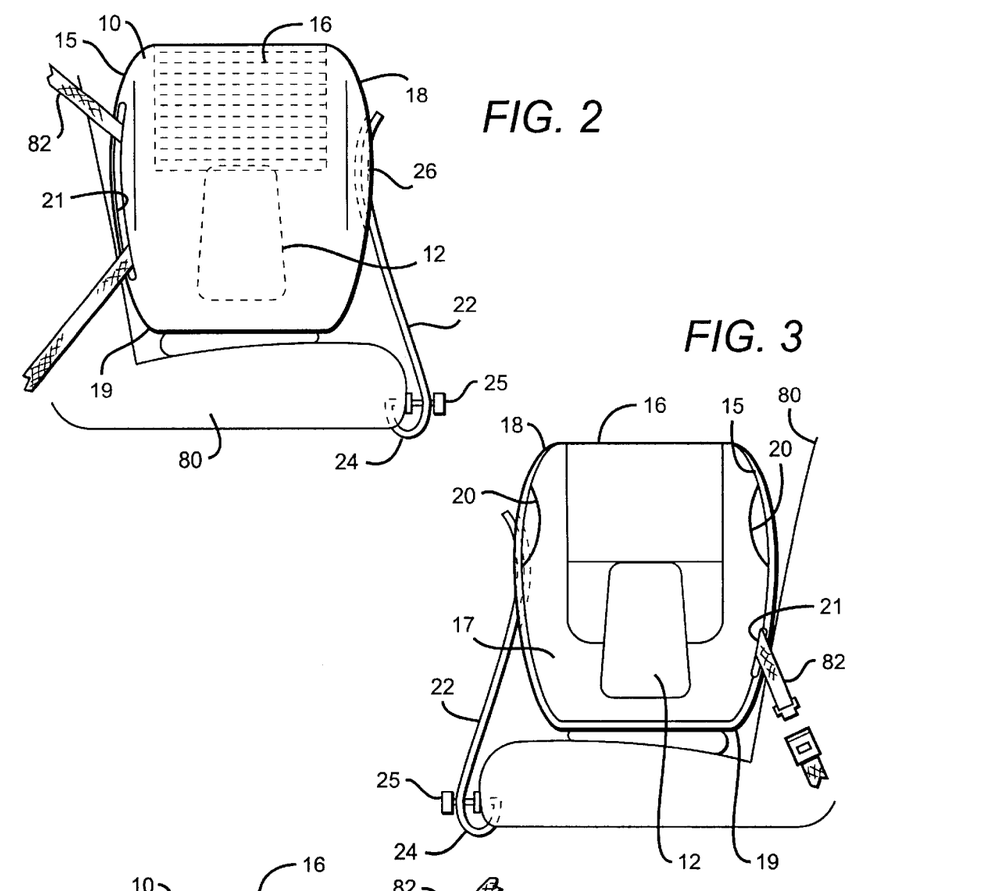
FIG. 2 is a rear view of a child car seat assembly according to a representative embodiment of the invention.
FIG. 3 is a front view of a child car seat assembly according to a representative embodiment of the invention.

FIG. 2 illustrates a back view of child car seat assembly 10 when mounted as shown in FIG. 1. Visible from this angle is side panel 15 which is opposite from side panel 18 and abuts the back of automobile seat 80. As shown in FIG. 2, child car seat assembly 10 is also secured to automobile seat 80 by looping seatbelt 82 through an elongated channel 21 in side panel 15. By then tightening seatbelt 82, child car seat assembly 10 can be secured to automobile seat 80 from side panel 15 as well as from side panel 18. This technique of strapping child car seat assembly 10 from both the inner and outer sides often can provide additional security which will stabilize the car seat assembly 10 in the event the automobile's airbag is deployed. It is noted that if seatbelt 82 is self-adjusting, then it is preferable to first tighten seatbelt 82 and then lock seatbelt 82 into position using a locking clip, as is well known in the art.

FIG. 3 illustrates a front view of car seat assembly 10 when mounted as shown in FIG. 1. If car seat assembly 10 is mounted in the front passenger seat of the automobile, then FIG. 3 illustrates the driver's view of the child car seat assembly 10. As shown in FIG. 3, child car seat assembly 10 includes a front opening 17 which permits an unobstructed front view of the child seated in child car seat assembly 10. At the same time, side panels 15 and 18 are connected to each other by top panel 16 and bottom panel 19, providing a reinforced structure which is much more resistant to compressive forces, such as might be exerted by a deploying airbag, than most conventional car seats. At the same time, the strap 22 and hook 24 assembly tends to prevent child car seat assembly 10 from turning over in the event an automobile airbag is deployed.

Although child car seat assembly 10 is shown in FIGS. 1 and 3 as having a channel 21 to accommodate the seatbelt on the left side and a strap and hook assembly on the right side, it should be understood that the strap and hook assembly may instead be disposed on the left side and the channel 21 for accommodating the seatbelt on the right side. This latter embodiment might be particularly advantageous for use in right-side drive vehicles, such as are found in many foreign countries. Alternatively, each of the left and right sides of the child car seat assembly 10 may be provided with both a channel for accommodating a seatbelt and a latch for accommodating a strap so that child car seat assembly 10 may be mounted so as to face right or so as to face left.

Figure 4:
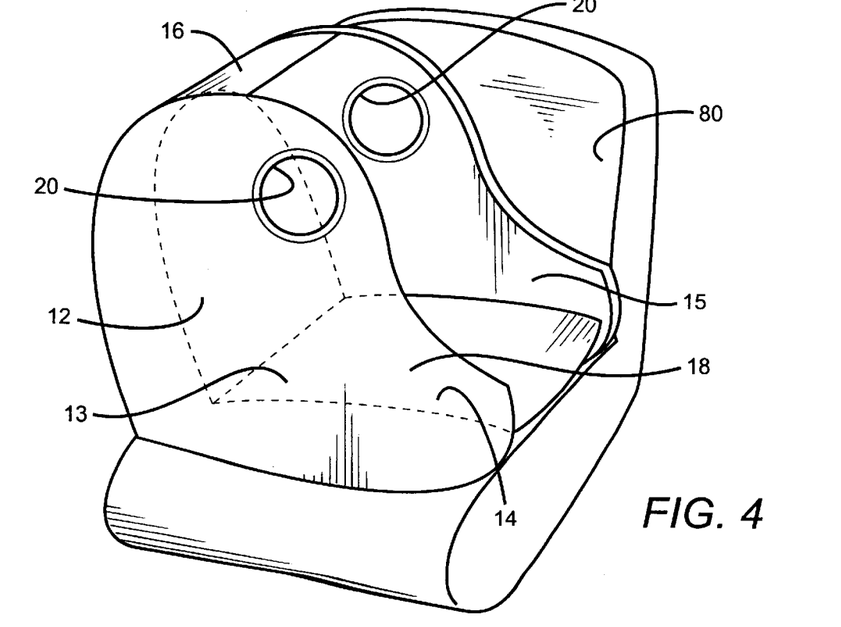
FIG. 4 is a perspective view of a child car seat according to a representative embodiment of the invention.

FIG. 4 illustrates an alternative embodiment of a car seat according to the present invention. In the car seat shown in FIG. 4, the seat 13 is less reclined and back portion 12 extends up to upper panel 16. Not shown in FIG. 4 are the attachment means, such as a channel and an adjustable strap and hook assembly, as described in detail above.

Figure 5:
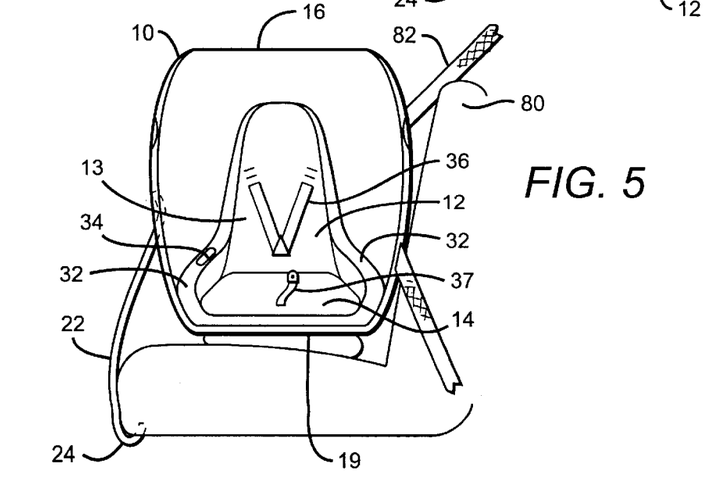
FIG. 5 is a front view of a child car seat assembly according to a representative embodiment of the invention.

FIG. 5 illustrates a front view of child car seat assembly 10 and shows in more detail the features of the seat 13 in a preferred embodiment of the invention. Specifically, seat 13 includes arm rests 32, one of which includes a bottle holder 34, such as for holding a baby bottle or a cup. The back portion 12 of seat 13 includes an upper seatbelt portion 36 which preferably is comprised of a "V"-shaped belt with a buckle disposed at the vertex. Attached to seat portion 14 is lower belt portion 37 which preferably comprises a single strap terminating in a buckle. Preferably, at least one of upper portion 36 and lower portion 37 is adjustable so as to adequately secure children of different sizes. The buckles preferably snap together so as to secure lower portion 37 to upper portion 36.

Figure 6:
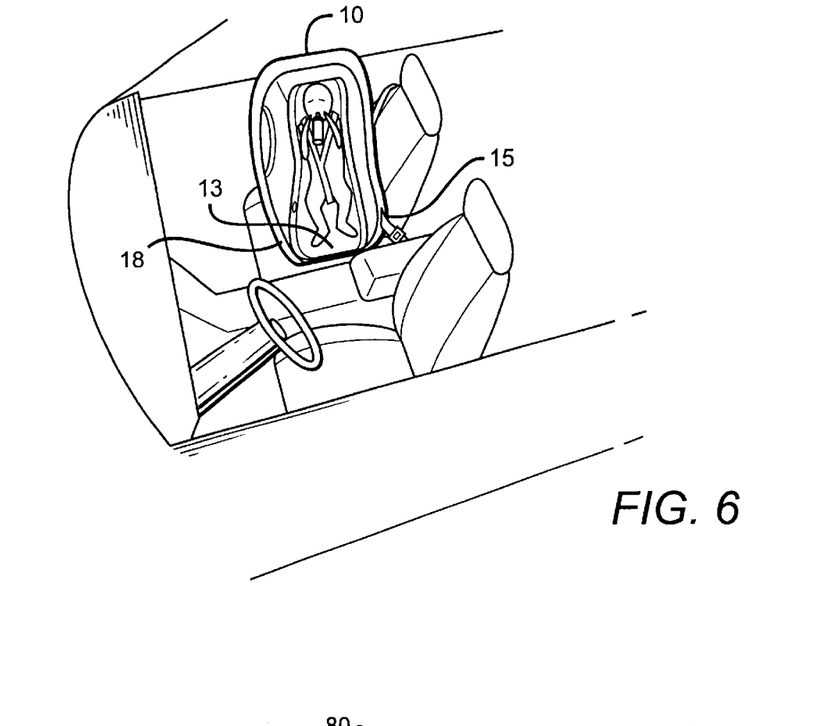
FIG. 6 is a top perspective view of the front seat of an automobile with a child seat assembly installed according to a representative embodiment of the invention installed.

FIG. 6 is a top view of a child care seat assembly 10 installed in the front passenger seat of an automobile according to an alternative embodiment of the invention. The child car seat assembly 10 shown in FIG. 6 does not include a top panel, but rather is open on top, as well as in front. However, child car seat assembly 10 still includes oversized side panels 15 and 18 to shield against deployment of an airbag. Preferably, panels 15 and 18 are at least 15 inches on average higher than the surface of child car seat 13, so as to adequately protect a child from deployment of an airbag.

Figure 7:
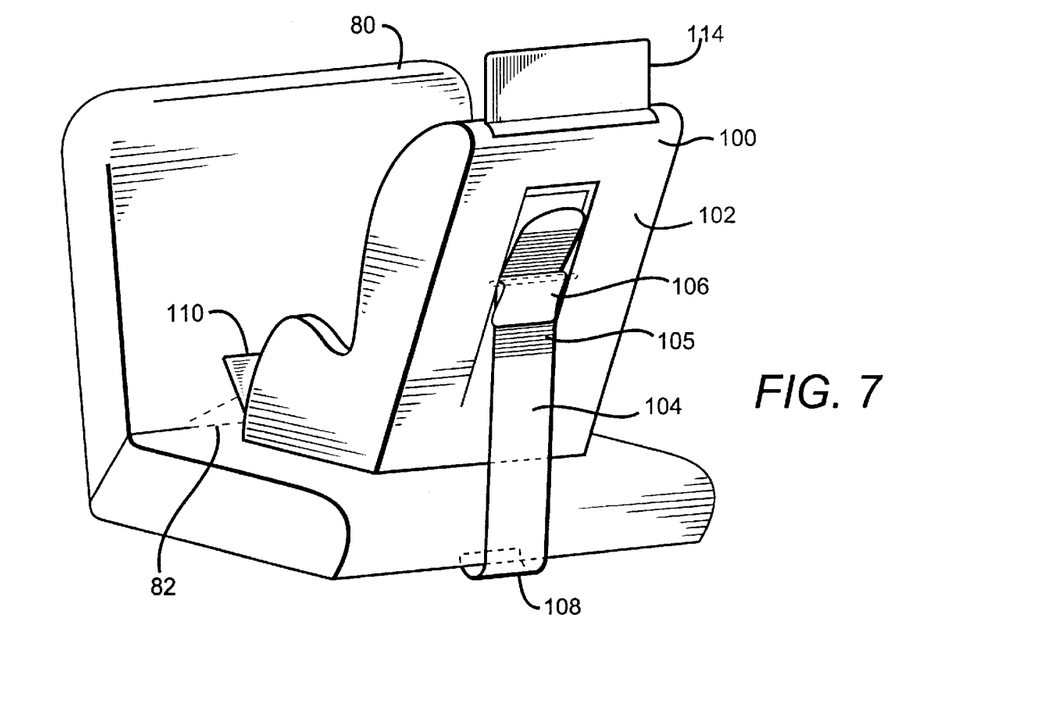
FIG. 7 is a rear perspective view of a child car seat assembly installed on an automobile seat according to a representative embodiment of the invention.

FIG. 7 illustrates an alternative embodiment of the invention. Specifically, shown in FIG. 7 is child car seat assembly 100 which is mounted on an automobile seat 80 in a rear facing direction. As shown in FIG. 7, child car seat assembly 100 is mounted to automobile seat 80 by looping seatbelt 82 through channel 110 in order to secure the front portion of child care seat assembly 100. In addition, the back portion of car seat assembly 100 is secured to the front portion of automobile seat 80 using a strap and hook assembly, similar to that described above in connection with FIG. 1. In more detail, strap 104 includes ridges 105 which are similar to ridges 23. Similarly, latch 106 is similar to latch 26 shown in FIG. 1. At the base of strap 104 is hook 108 which is similar to hook 24 shown in FIG. 1. Although not shown in FIG. 7, hook 108 may be further secured using a clamping mechanism such as clamping mechanism 25 shown in FIG. 1. By double securing child car seat assembly 100 in the foregoing manner, child car seat assembly 100 is less likely to topple over in the event an automobile airbag deploys. In order to further shield a child sitting in child car seat assembly 100 from deployment of airbag, child car seat assembly 100 is also supplied with an extension panel 114, which preferably is made from a hard plastic, although any other material that is strong enough to shield against the force of a deploying airbag may instead be used.

As illustrated in FIG. 7, the strap and hook mechanism according to the present invention can be used to further secure a child car seat within an automobile. In the above-described embodiments, the strap and hook mechanism is used to secure child car seats when installed in side-facing and backward-facing orientations. Although not specifically illustrated, it should also be understood that by utilizing a strap and hook mechanism as described above on the front portion of the child car seat, a more secure attachment also can be achieved when the child car seat assembly is oriented in the front-facing direction.

Furthermore, various other structures may be used to secure the portion of the child car seat assembly that is closest to the front of the automobile seat to which it is to be attached (i.e., the outer portion), instead of the strap and hook assembly described above. Examples of these various structures are shown in FIGS. 8A through 8G.

Figure 8A:
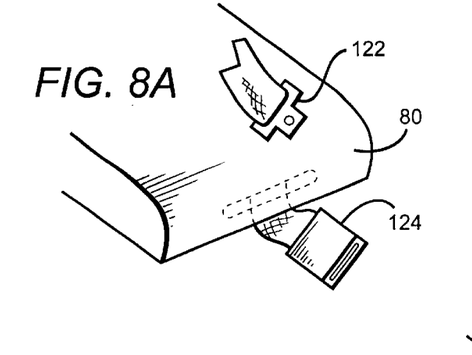
FIGS. 8A through 8E illustrate various alternative means for securing a child car seat assembly according to a representative embodiment of the invention to an automobile seat.

Specifically, FIG. 8A illustrates a male/female buckle assembly. In this assembly, male component 122 is at the end of a strap which, in turn, is attached to the child car seat assembly. Female component 124 is attached to the front of the automobile seat 80. To secure the child car seat assembly 10 to the automobile seat 80, male component 122 is inserted into female component 124 and the strap is tightened. It is noted that the assembly which is comprised of components 122 and 124 is similar to an automobile seat belt buckle. It is also noted that the strap may be tightened by utilizing a tightening mechanism which is ordinarily employed in automobile seatbelts, or by using any other tightening mechanism.

Figure 8B:
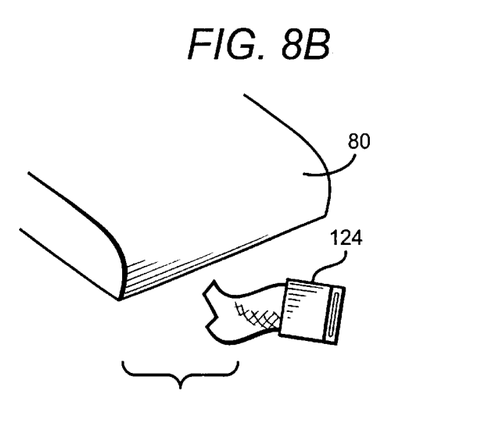

FIG. 8B illustrates an alternative embodiment in which female component 124, rather than being attached to automobile seat 80, is attached to the floor of the automobile directly in front of or underneath automobile seat 80. In this embodiment also, the male component is attached to a strap which is attached to the child car seat assembly, as described above in connection with FIG. 8A.

Figure 8C:
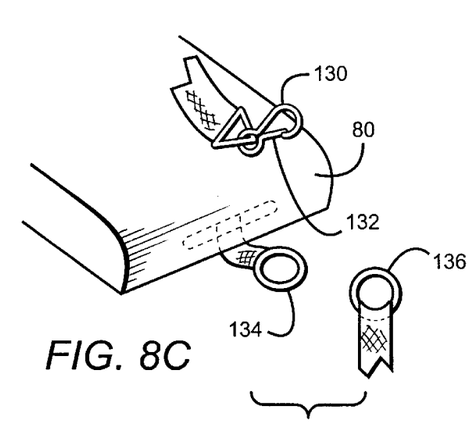

FIG. 8C illustrates a still further embodiment in which the strap attached to the child car seat assembly terminates in a clip 130 which includes a spring loaded latch 132 that is tensioned so as to maintain clip 130 in the closed position. A ring 134 is attached to automobile seat 80. Alternatively, a ring 136 may be attached to the floor of the automobile directly in front of or underneath automobile seat 80. In this embodiment, clip 130 is attached to ring 134 or ring 136 by retracting latch 132, hooking hook 130 onto ring 134 or ring 136, and then allowing latch 132 to return to the closed position. Finally, the strap attached to clip 130 is tightened using a tightening mechanism.

Figure 8D:
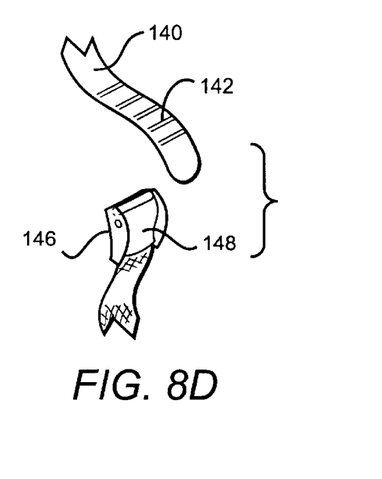

FIG. 8D illustrates a still further apparatus for securing the child car seat assembly. In this embodiment, strap 140 which is attached to the child car seat assembly includes ridges 142. Buckle 146 includes a spring loaded latch 148, such that strap 140 can be inserted into buckle 146 but cannot be retracted from buckle 146 unless latch 148 is manually raised. Such an assembly is commonly used to tighten ski boots. Because buckle 146 can be adjustably attached to strap 140, no separate tightening means is generally required. Once again, it is noted that the strap attached to buckle 146 may be attached either to an automobile seat or to the floor directly in front of or underneath the automobile seat.

Figure 8E:
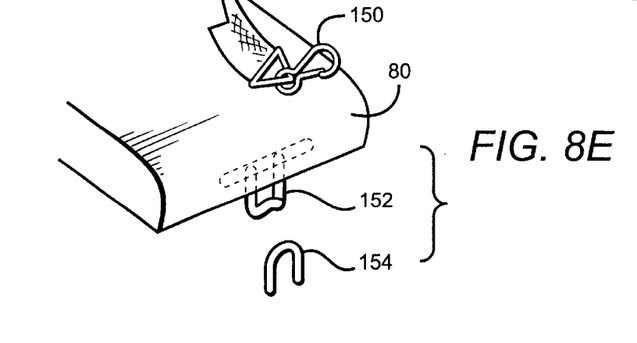

FIG. 8E illustrates a still further means of attaching a child car seat assembly to an automobile seat 80. In this embodiment, piece 150 can be connected either to piece 152 (which is attached to automobile seat 80) or to piece 154 (which is attached to the floor of the automobile). Each of pieces 150, 152 and 154 is comprised of a curved rigid material, such as steel or another metal. By sliding the separate pieces together at a specific angle and then turning one with respect to the other, piece 150 can be interlocked with either piece 152 or piece 154. Then, by pressing together and turning to the appropriate angle the two pieces can be disengaged. Once again, the strap attached to piece 150 preferably can be tightened so as to secure the attachment.

In most of the foregoing embodiments, a tightening mechanism is used to tighten the strap attached to the child car seat. However, it should be understood that the strap attached to the floor of the automobile or the automobile seat may instead include the tightening mechanism. Furthermore, it is also possible to switch the components attached to the child car seat assembly and the automobile seat (or floor) in the embodiments described above, or to use any other attachment means in order to secure the child car seat assembly to the automobile seat.

Figures 9A, 9B:
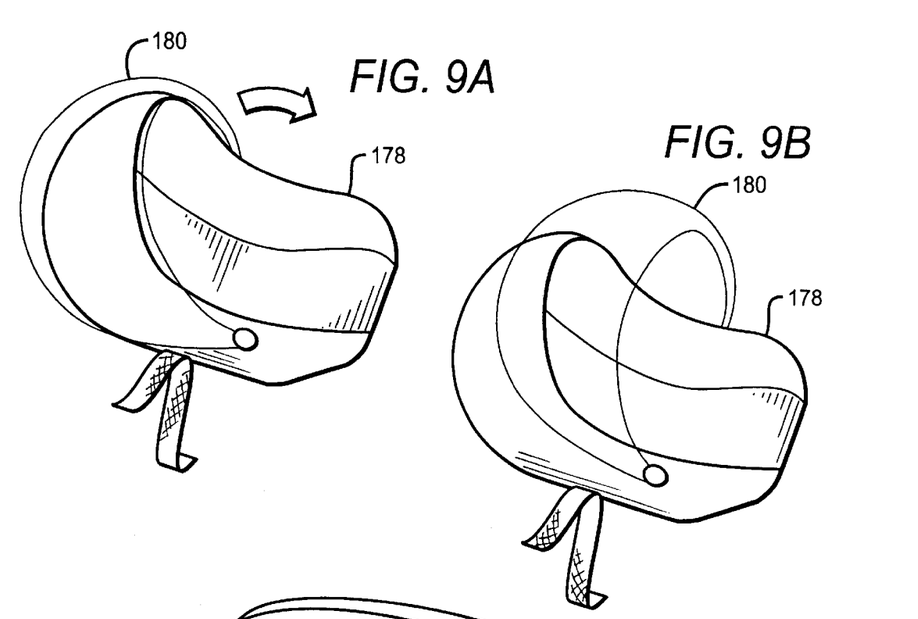
FIGS. 9A and 9B illustrate a child car seat having a retractable canopy according to a representative embodiment of the invention.

FIGS. 9A and 9B illustrate a child car seat assembly 178 having a retractable canopy 180. Preferably, canopy 180 is comprised of a hard material, such as a hard plastic, so as to shield a child seated in child car seat assembly 178 from deployment of an automobile airbag. As shown in FIG. 9A, canopy 180 can be retracted so that the top portion of child car seat assembly 178 is uncovered. When desired, canopy 180 can be rotated into the position shown in FIG. 9B so as to provide additional shielding protection. Typically, canopy 180 will be rotated into the position shown in FIG. 9B when child car seat assembly 178 is installed in the front seat of an automobile which has a passenger side airbag.

In the embodiments described above, the inner portion of the child car seat assembly is secured to the automobile seat by feeding the car seat belt through an elongated channel in the child car seat assembly. While this is the preferred technique for securing the inner portion of the child car seat assembly, it should be understood that other techniques may be used instead. For instance, the inner portion of the child car seat assembly may also be provided with a strap and either a hook or a clip which can attach, for example, either to the automobile seat belt or to the housing for the automobile seat belt.

Figures 10A, 10B:
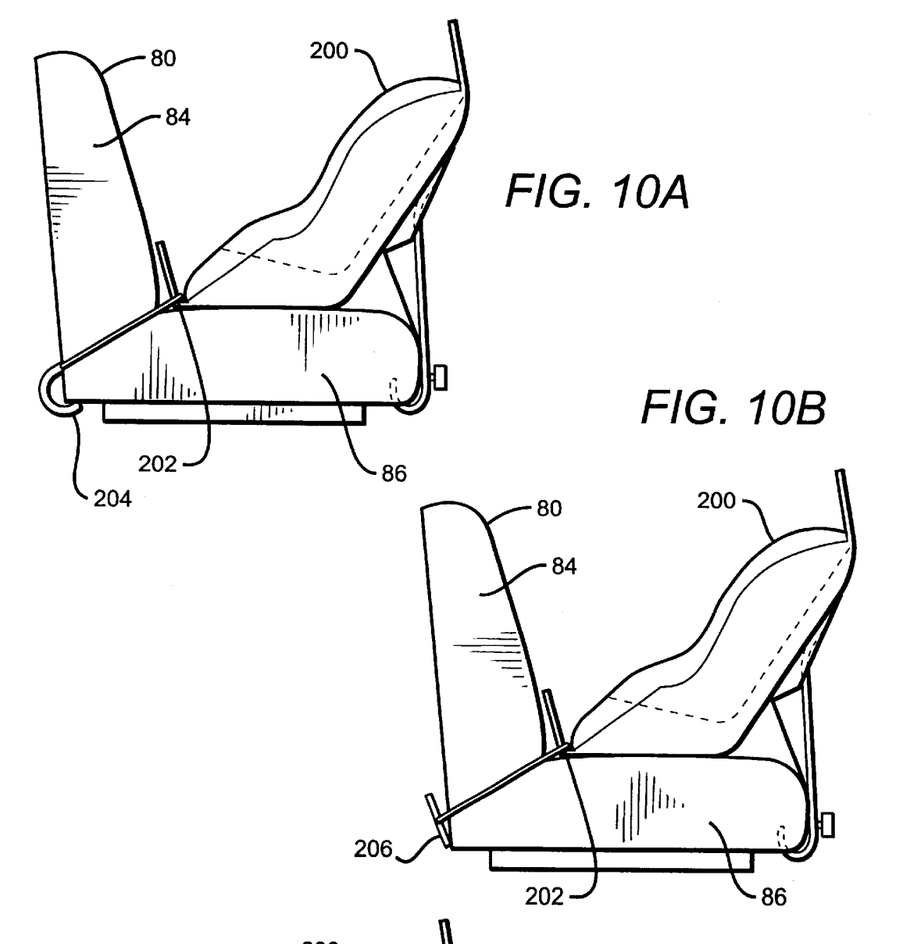
FIGS 10A through 10C illustrate a rear facing child car seat assembly secured to an automobile seat using a strap and hook assembly according to a representative embodiment of the invention.
Figure 10C:
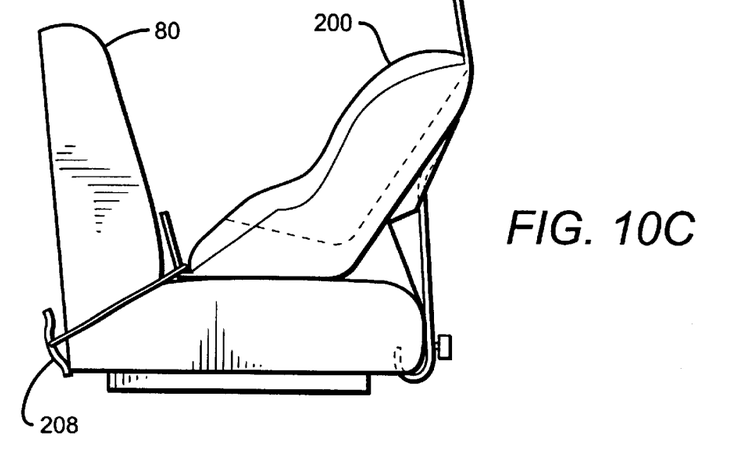

Similarly, FIGS. 10A, 10B and 10C illustrate further embodiments for attaching the front of child car seat assembly 200 to automobile seat 80. For instance, in FIG. 10A, child car seat assembly 200 is provided with a strap 202 and a hook 204. Strap 202 is attached at one end to child car seat assembly 200 and is attached at the other end to hook 204. In this embodiment, strap 202 is fed through the gap between the back portion 84 of automobile seat 80 and the bottom portion 86 of automobile seat 80. Then, hook 204 is hooked to the underside of the back portion of automobile seat 80.

FIG. 10B illustrates an alternative embodiment in which automobile seat 200 is provided with a strap 202 that is attached at one end to automobile seat assembly 200 and at the other end to plate 206. Once again, strap 202 is fed through the gap between portions 84 and 86 of automobile seat 80. In this embodiment, plate 206 abuts against the back portion 84 of automobile seat 80 so as to anchor child car seat assembly 200. Instead, if desired, plate 206 may be mounted to the floor of the automobile in order to provide a secure point to which strap 202 can be connected.

FIG. 10C illustrates a further embodiment which is similar to the embodiment shown in FIG. 10B, except that plate 206 has been replaced by plate 208. While plate 206 is of a standard size and shape, plate 208 is contoured and sized so as to be used with a particular automobile seat 80. In each of the embodiments illustrated in FIGS. 10A through 10C, it is preferable that strap 202 is provided with a tightening mechanism, such as any of the tightening mechanisms described above, for tightly securely child car seat assembly 200 to automobile seat 80.

Figure 11A:
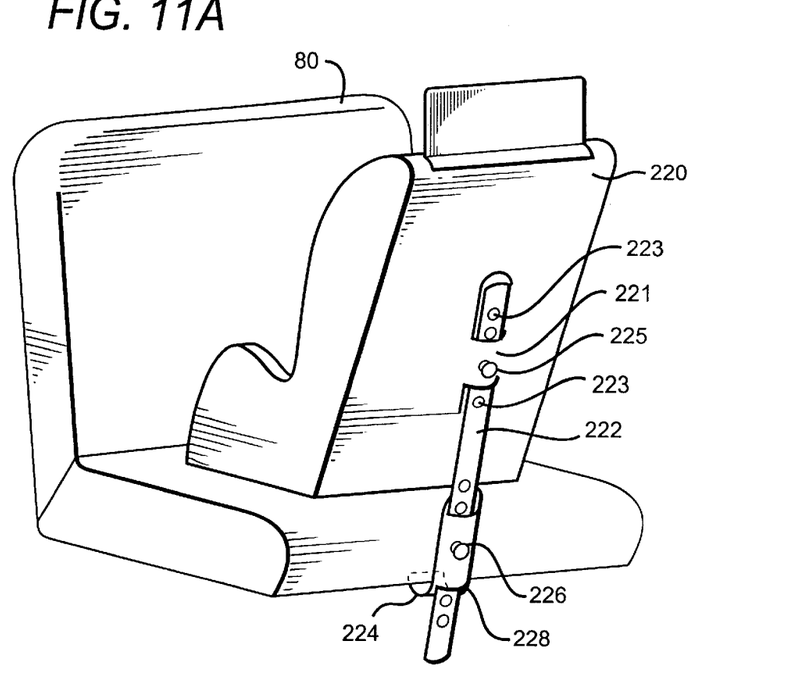
FIGS. 11A and 11B illustrate a rear-facing child car seat assembly attached to an automobile seat using an adjustable rigid bar and hook assembly according to a representative embodiment of the invention.
Figure 11B:
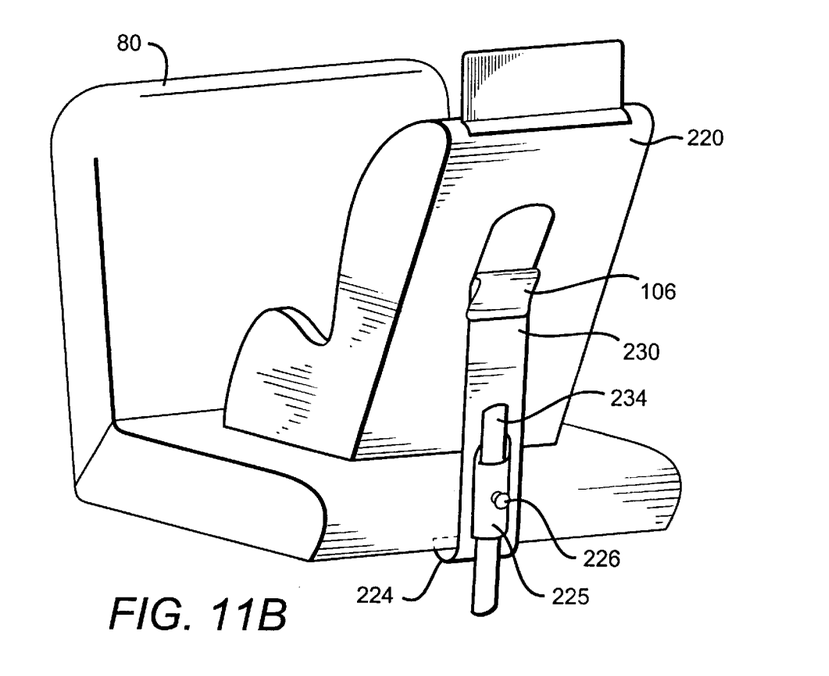

FIGS. 11A and 11B illustrate alternative embodiments in which a child car seat assembly 220 is secured to the front portion of an automobile seat 80 using a rigid bar, in connection with a hook. Thus, for example, in FIG. 11A the back of child car seat assembly 220 includes channel 221 through which rigid bar 222 is inserted. Attached to channel 221 is pin 225 which passes through a hole in channel 221 and through one of the holes 223 in rigid bar 222 so as to fixedly secure rigid bar 222 to child car seat assembly 220. Preferably, pin 225 is spring loaded toward the back of child car seat assembly 220. Thus, adjusting child car seat assembly 220 relative to rigid bar 222 involves retracting pin 225, adjusting the relative positions to the desired point and then possibly making a minor adjustment until the closest hole is found. At this point, release of pin 225 will cause pin 225 to enter the subject hole 223, thereby locking child car seat assembly 220 into position relative to rigid bar 222. Similarly, hook 224 is fixedly attached to open cylinder 228 which includes a pin 226. Preferably, pin 226 is spring loaded in the same manner as pin 225 described above. In this way, hook 224 can be adjusted to any of the discrete positions relative to rigid bar 222 as defined by the holes 223. Adjusting hook 224 in back of child car seat assembly 220 in this manner, child car seat assembly 220 can be secured to the front side of automobile seat 80. Moreover, rigid bar 222 can be adjusted with respect to child car seat assembly 220 so that the end of rigid bar 220 rests against the floor of the automobile. In this way, rigid bar 222 can provide additional support for child car seat assembly 220, preventing child car seat assembly 220 from tilting backwards, thereby causing hook 224 to disengage from the underside of automobile seat 80.

FIG. 11B illustrates an alternative embodiment in which child car seat assembly 220 is secured to the front portion of automobile seat 80 using both a strap 230 and a rigid bar 234. In this embodiment, hook 224 is attached to cylindrical channel 228 which includes a pin 226, identical to the embodiment shown in FIG. 11A. In this manner, rigid bar 234 can be adjusted relative to hook 224 so that rigid bar 234 rests against the floor of the automobile. In this way, rigid bar 234 provides additional support to prevent hook 224 from being dislodged from underneath automobile seat 80 in the event of a force which attempts to tilt child car seat assembly 220 backwards. At the same time, hook 224 is attached to strap 230 which, in turn, is attached to the back of child car seat assembly 220. Specifically, strap 230 is adjustably attached to the back of child car seat assembly 220 using latch 106. It is noted that this adjustable attachment is identical to the adjustable attachment means described above in connection with the embodiment illustrated FIG. 7. However, it should be noted that any other attachment means may be used instead.

Although not shown, in the embodiments illustrated in each of FIGS. 11A and 11B, child car seat assembly 220 preferably also is secured to automobile seat 80 using the automobile's seatbelt, as described above in connection with the other embodiments of the invention. However, the inner portion of car seat assembly 220 may instead be attached to automobile seat 80 in any other manner, as discussed above.

Figure 12A:
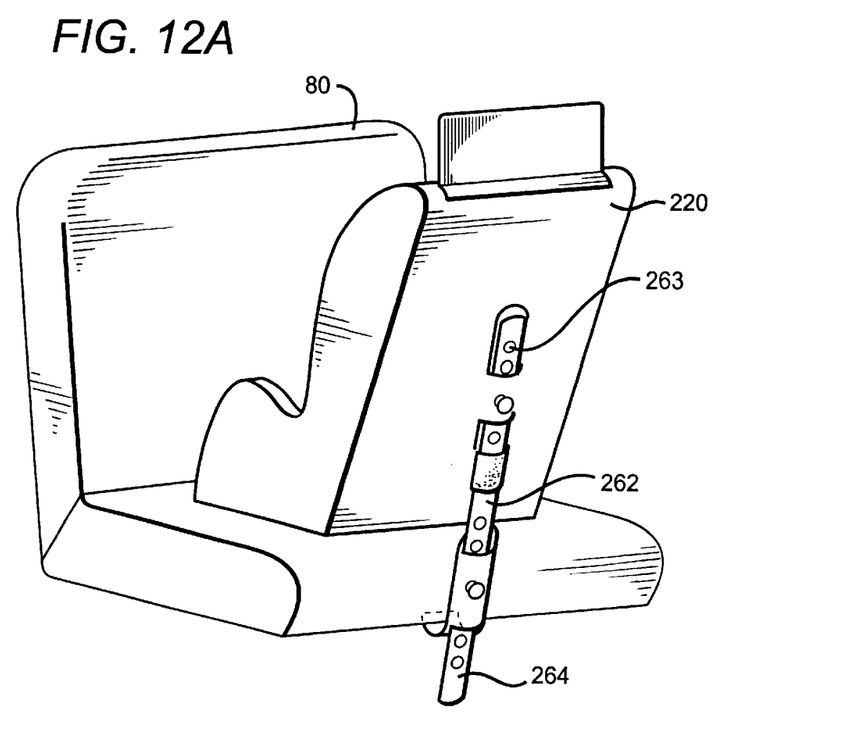
FIGS. 12A and 12B illustrate alternate embodiments of the present invention.
Figure 12B:
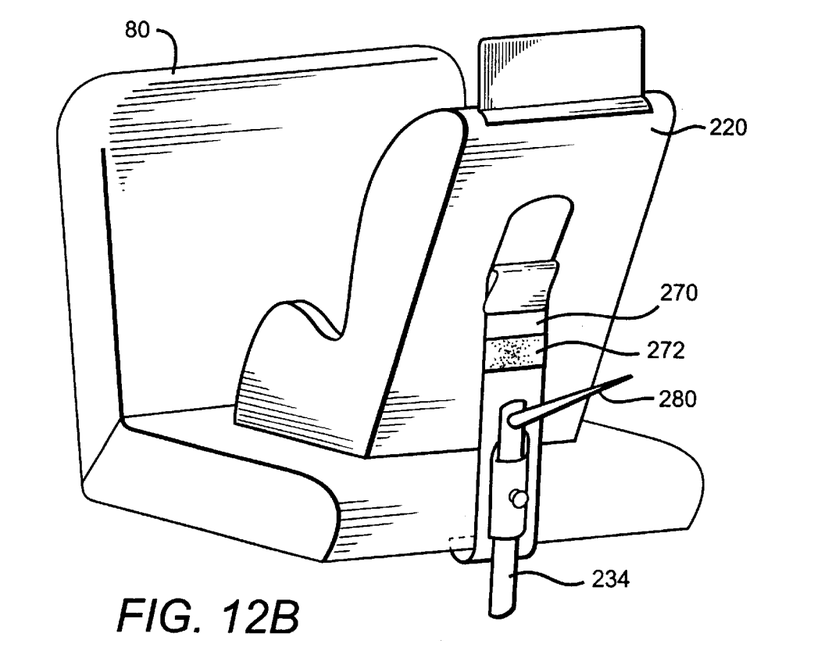

FIGS. 12A and 12B illustrate further alternative embodiments of the present invention. The embodiments shown in FIGS. 12A and 12B are similar to the embodiments shown in FIGS. 11A and 11B, respectively, except that the mechanism for securing the child car seat assembly 220 to the underside of automobile seat 80 includes a spring or elastic portion.

In more detail, rigid bar 262 in FIG. 12A is similar to rigid bar 222 in FIG. 11A, except that rigid bar 262 includes two separate pieces 263 and 264, and one of pieces 263 and 264 telescopes into the other, in a shock-absorber fashion. A spring-like force holds pieces 263 and 264 together, such that although pieces 263 and 264 can be pulled away from each other, the force pulling the two pieces toward each other increases as they are moved apart from each other. This attractive force can be provided by actually attaching pieces 263 and 264 with one or more springs, by using an expandable gas or fluid, as in a shock absorber, or in any other manner known in the art. Including such an elastic component often can have the effect of absorbing some of the impact of a deploying airbag.

Similarly, strap 270 is similar to strap 230, except that strap 270 includes an elastic portion 272. In the embodiment shown in FIG. 12B, elastic portion 272 is implemented using several springs. However, elastic portion 272 might instead by implemented using any other elastic material, such as natural or synthetic rubber. Including elastic portion 272 also can have the effect of absorbing some of the impact of a deploying airbag.

Also shown in FIG. 12B is a fail-safe needle 280, protruding from rigid bar 234. Fail-safe needle 280 essentially is a spike, which preferably is comprised of steel or some other hard metal, and which functions to puncture an airbag upon deployment. Preferably, fail-safe needle 280 is disposed near the bottom of the airbag so that the gases released from the airbag will tend to flow downward and away from child car seat assembly 220.

Conclusion

As noted above, most conventional child car seats are installed in the back seat of an automobile, primarily to avoid problems associated with airbag deployment. However, installation of a child car seat in the back seat of an automobile, particularly when the child car seat is rear-facing, creates additional problems such as difficulty of installation and inability to maintain visual contact with the child.

The present invention addresses these problems in a number of different respects, thereby allowing a child car seat assembly to be installed in the front seat of an automobile. In one aspect, a child car seat according to the present invention is oriented at a right angle to the automobile seat. One advantage of such a configuration is to avoid a direct head-on or rear impact from an airbag. As an additional benefit, the child can be oriented so as to face toward the driver, thereby facilitating visual contact between the driver and the child.

By also utilizing side panels which are sized and shaped so as to shield a seated child from deployment of an airbag, the child car seat assembly according to the present invention typically can sufficiently protect a child so as to enable the child to be seated in the front seat. The exact configuration of the side panels is not critical, but it is preferable that they are sized and shaped so as to shield a seated child from the forces imparted by deployment of an airbag. Thus, various designs and engineering tradeoffs will be possible, as will be understood by those skilled in the art. In the embodiments described above, it is preferable that the outer side panel is at least 15 inches on average higher than the surface of the car seat and/or that the outer side panel is integrally formed with the inner side panel and connected with a top panel which provides additional reinforcement. However, these specific features are not critical and other designs will accomplish the same purpose. Factors such as type and thickness of the material used to form the various panels, as well as the size of the panels, may be varied to achieve different aesthetic as well as protective properties. It is also noted that shielding from airbag deployment will only be desirable for installation in automobiles having airbags. However, it is emphasized that the most important feature of this aspect of the invention is that the child car seat is oriented at a right angle to the automobile seat.

Figure 13:
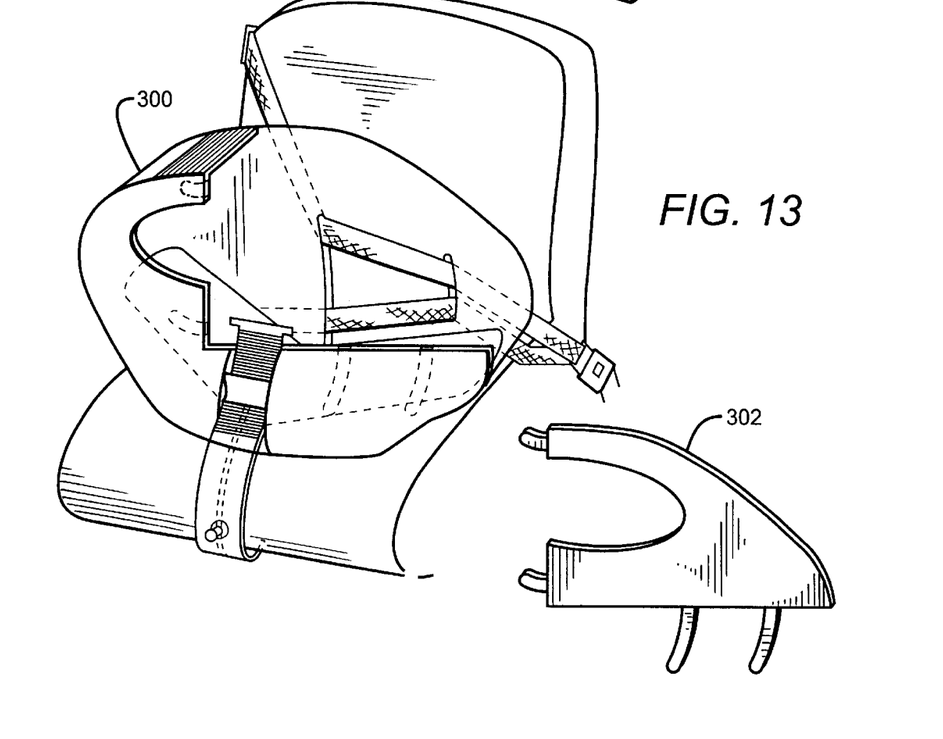
FIG. 13 illustrates a child car seat assembly having a removable side panel.

In other embodiments of the invention, the child car seat assembly according to the present invention is configured so as to be capable of installation either in the side saddle position described above or in convention front-facing or rear-facing orientations. This may be achieved in a variety of ways, such as by duplicating the various attachment means on different panels of the child car seat assembly. Particularly, in connection with such a flexibly designed child car seat assembly, it may also be desirable to have one or more of the panels be removable, so that a panel which is not required to shield the child from deployment of an airbag in a particular orientation may be removed. Thus, as shown FIG. 13, panel 302 is removable from child car seat assembly 300.

In another aspect, the present invention provides an additional means for securing a child car seat assembly to an automobile seat. This additional means may, for example, be in addition to using the automobile's seatbelt, which most conventional child car seats use exclusively. In the preferred embodiment of the invention, this additional securing means includes a strap attached at one end to the child car seat assembly and attached at the other end to a hook that may be hooked to the underside portion of the automobile seat. Preferably, the additional securing means is flexible or semi-rigid. As noted above, this additional securing means can be utilized whether the child car seat assembly is oriented in the side saddle position (i.e., at a right angle to the automobile seat), in the rear-facing position or in the front-facing position. Preferably, the strap is adjustable so that once the hook is hooked underneath the automobile seat, the attachment can be secured. As a result of using both securing means, the child car seat assembly can be stabilized at two opposite points, which is particularly advantageous for protecting against deployment of an airbag. Preferably, the hook is made of a material that is rigid enough to prevent bending when exposed to forces of the magnitude imparted by a deploying airbag. Such materials might include, for example, iron, steel, other metals or reinforced plastics or composite materials.

A particular advantage of utilizing the one of above-described hook mechanisms is that generally such a mechanism can be used in connection with any automobile seat, whereas many conventional child car seat require specially configured automobile seats. However, it is noted that the present invention also contemplates using other securing means, as described in more detail above.

Although the present invention has been described in detail with regard to the exemplary embodiments and drawings thereof, it should be apparent to those skilled in the art that various adaptations and modifications of the present invention may be accomplished without departing from the spirit and the scope of the invention. Accordingly, the invention is not limited to the precise embodiments shown in the drawings and described in detail hereinabove. Rather, it is intended that all such variations not departing from the spirit of the invention be considered as within the scope thereof as limited solely by the claims appended hereto.

Also, several different embodiments of the present invention are described above, with each such embodiment described as including certain features. However, it is intended that the features described in connection with the discussion of a single embodiment are not limited to that embodiment but may be included and/or arranged in various combinations in any of the other embodiments as well, as will be understood those skilled in the art.

In the following claims, those elements which do not include the words "means for" are intended not to be interpreted under 35 U.S.C. §112 ¶ 6.

What is claimed is:

1. A child car seat assembly for installation on an automobile seat using the seat belt provided with the automobile seat, comprising:
    a seat portion having a front, a back, a first side and a second side, wherein when a child is seated in said seat portion the child faces the front of said seat portion;
    a first side panel adjacent to the first side of said seat portion, said first side panel having attachment means for attaching said child car seat assembly to the automobile seat using the seat belt, wherein when the seat belt is tightened as much as possible, said seat portion faces a direction that is at a right angle to a direction faced by the automobile seat;
    a second side panel adjacent to the second side of said seat portion, said second side panel being sized and shaped to shield a child in the seat portion from deployment of an automobile air bag;
    a strap; and
    a hook,
    wherein the strap is attached at one end to said second side panel and is attached at its other end to the hook, and
    wherein the hook includes a clamping mechanism for clamping onto the automobile seat.

2. A child car seat assembly according to claim 1, wherein the first side panel is disposed on a left side of said seat portion when looking from the back of said seat portion to the front of said seat portion.

3. A child car seat assembly according to claim 1, wherein said attachment means comprises an elongated channel.

4. A child car seat assembly according to claim 1, wherein said first side panel and said second side panel are integrally formed into a unitary piece.

5. A child car seat assembly for installation on an automobile seat using the seat belt provided with the automobile seat, comprising:
    a seat portion having a front, a back, a first side and a second side, wherein when a child is seated in said seat portion the child faces the front of said seat portion;
    a first side panel adjacent to the first side of said seat portion, said first side panel having attachment means for attaching said child car seat assembly to the automobile seat using the seat belt, wherein when the seat belt is tightened as much as possible, said seat portion faces a direction that is at a right angle to a direction faced by the automobile seat; and
    a second side panel adjacent to the second side of said seat portion, said second side panel being sized and shaped to shield a child in the seat portion from deployment of an automobile air bag,
    wherein at least one of said first side panel and said second side panel is removable.

6. A child car seat assembly according to claim 1, wherein said second side panel includes a clear window.

7. A child car seat assembly for installation on an automobile seat using the seat belt provided with the automobile seat, comprising:
    a seat portion having a front, a back, a first side and a second side, wherein when a child is seated in said seat portion the child faces the front of said seat portion;
    a first side panel adjacent to the first side of said seat portion, said first side panel having attachment means for attaching said child car seat assembly to the automobile seat using the seat belt, wherein when the seat belt is tightened as much as possible, said seat portion faces a direction that is at a right angle to a direction faced by the automobile seat;
    a second side panel adjacent to the second side of said seat portion, said second side panel being sized and shaped to shield a child in the seat portion from deployment of an automobile air bag;
    a strap; and
    a hook,
    wherein the strap is attached at one end to said second side panel and is attached at its other end to the hook, and
    wherein the hook is rigid and is configured for hooking to an underside portion of the automobile seat.

8. A child car seat assembly according to claim 7, wherein a length of the strap can be adjusted.

9. A child car seat assembly according to claim 1, wherein a length of the strap can be adjusted.

10. A child car seat assembly according to claim 1, further comprising a strap and a hook, wherein the strap is attached at one end to the hook and can be attached at its other end either to said second side panel or to said first side panel.

11. A child car seat assembly according to claim 10, wherein the strap can be attached at said other end to at least one of the front and back of the seat portion.

12. A child car seat assembly according to claim 1, wherein said second side panel is at least 15 inches higher on average than said seat portion.

13. A child car seat assembly for installation on an automobile seat using the seat belt provided with the automobile seat, comprising:
    a seat portion having a front, a back, a first side and a second side, wherein when a child is seated in said seat Portion the child faces the front of said seat portion;
    a first side panel adjacent to the first side of said seat portion, said first side panel having attachment means for attaching said child car seat assembly to the automobile seat using the seat belt, wherein when the seat belt is tightened as much as possible, said seat portion faces a direction that is at a right angle to a direction faced by the automobile seat;
    a rigid bar; and
    a hook,
    wherein the hook is attached to one end of the rigid bar and the other end of the rigid bar is adjustably attached to said seat portion.

14. A child car seat assembly for installation on an automobile seat using the seat belt provided with the automobile seat, comprising:

a seat portion having a front, a back, a first side and a second side, wherein when a child is seated in said seat portion the child faces the front of said seat portion;

a first side panel adjacent to the first side of said seat portion, said first side panel having attachment means for attaching said child car seat assembly to the automobile seat using the seat belt, wherein when the seat belt is tightened as much as possible, said seat portion faces a direction that is at a right angle to a direction faced by the automobile seat;

a second side panel adjacent to the second side of said seat portion, said second side panel being sized and shaped to shield a child in the seat portion from deployment of an automobile air bag;

a rigid hook; and an adjustable strap attached at one end to said second side panel and attached at its other end to the rigid hook, wherein the rigid hook is configured for hooking to an underside portion of the automobile seat and includes a clamping mechanism for clamping onto the automobile seat.

15. A child car seat assembly according to claim 14, wherein said second side panel is at least 15 inches higher on average than said seat portion.

16. A method for installing a child car seat assembly on an automobile seat using the seat belt provided with the automobile seat and a strap connected at one end to the child car seat assembly and connected at the other end to a hook, said method comprising:

orienting the child car seat assembly such that the child car seat assembly faces a direction that is at a right angle to a direction faced by the automobile seat; and performing the following steps while the child car seat assembly is so oriented:

strapping the child car seat assembly to the automobile seat using the seat belt;

hooking the hook to an underside portion of the automobile seat;

tightening the seat belt;

tightening the strap; and clamping the hook onto the automobile seat.

17. A method according to claim 16, wherein the child car seat assembly includes an oversized panel on a dashboard side of the child car seat assembly for shielding a child sitting in the child car seat assembly from deployment of an automobile air bag.

18. A child car seat assembly for installation on an automobile seat using the seat belt provided with the automobile seat, comprising:

strapping means for strapping the child car seat assembly to the automobile seat using the seat belt while said child car seat assembly faces a direction that is at a right angle to a direction faced by the automobile seat;

hooking means for hooking to an underside portion of the automobile seat;

connection means disposed between said hooking means and a main portion of said child car seat assembly;

tightening means for tightening said connection means; and clamping means for clamping said hooking means onto the automobile seat.

* * * * *